United States Patent [19]

Hirsch

[11] Patent Number: 6,028,855
[45] Date of Patent: Feb. 22, 2000

[54] CIRCUIT FOR SYNCHRONIZING CDMA MOBILE PHONES

[75] Inventor: Olaf Josef Hirsch, Sunnyvale, Calif.

[73] Assignee: Philips Electronics North America Corp., New York, N.Y.

[21] Appl. No.: 08/990,212

[22] Filed: Dec. 12, 1997

[51] Int. Cl.[7] ............................... H04J 3/06; H04B 1/16; H04B 7/00
[52] U.S. Cl. .................. 370/350; 455/343; 455/38.3; 455/574
[58] Field of Search ..................... 370/324, 320, 370/311, 332, 335, 503, 515, 310, 318, 342, 347, 441, 442, 343, 350; 341/173; 455/38.3, 343, 422, 550, 572, 573, 574; 375/356

[56] References Cited

U.S. PATENT DOCUMENTS

| | | | |
|---|---|---|---|
| 5,283,568 | 2/1994 | Asai et al. | 340/825.44 |
| 5,590,160 | 12/1996 | Ostman | 375/367 |
| 5,737,323 | 4/1998 | Landsome | 370/311 |
| 5,910,944 | 6/1999 | Callicotte et al. | 370/311 |
| 5,950,120 | 9/1999 | Gardner et al. | 455/343 |

FOREIGN PATENT DOCUMENTS

0744840A2  11/1996  European Pat. Off. ........ H04B 1/707

*Primary Examiner*—Hassan Kizou
*Assistant Examiner*—Duc Ho
*Attorney, Agent, or Firm*—Dicran Halajian

[57] ABSTRACT

A frequency calibration circuit for use in a spread spectrum receiver. The receiver includes circuitry for receiving a spread spectrum signal from a base station and for recovering a network clock signal therefrom, a low frequency oscillator for producing an oscillator clock signal, and a frequency comparator that takes as inputs the network clock signal and the oscillator clock signal and produces a calibration factor based on the difference between the clock signals. A controller coupled to the low frequency oscillator amd the frequency comparator utilizes the calibration factor together with the low frequency oscillator clock signal to output a accurate and precision timed signal thereby being able to accurately require the timing of the paging channel.

5 Claims, 1 Drawing Sheet

CIRCUIT FOR SYNCHRONIZING CDMA MOBILE PHONES

1. FIELD OF THE INVENTION

The present invention relates to communication systems employing code division multiple access, and in particular, to a relatively low power, synchronization technique utilizing low frequency oscillators in a spread spectrum communication system.

2. DESCRIPTION OF THE RELATED ART

In a telephone system using CDMA technology, a link channel consists of a pilot channel, a sync channel, a paging channel, and a traffic channel. The pilot channel is a channel for transmitting a pilot PN code repeatedly, and is used for obtaining and maintaining the synchronization at the mobile terminal equipment and for reproducing a clock signal.

In one known synchronization technique applicable for direct-sequence spread-spectrum communications, the system timing is maintained in part by a local oscillator in the mobile unit which must remain oscillating even while the mobile unit is in its idle mode. To keep the system timing as precise as possible, an accurate, high frequency (about 14–19 MHz) local oscillator is used in the mobile unit.

As described for example, in EP 744,840, paging (calling) messages are transmitted to the mobile terminal equipment with the interval of an integer times a superframe. To receive the paging message, the mobile terminal equipment should be restarted at a point in time before the head of the paging message because the mobile unit needs time to operate the stopped circuit and place it in a receivable state.

FIG. 1 is provided to illustrate the transmission in a CDMA system. Herein, the time period to permit the mobile unit to reacquire the exact timing of the paging channel to accurately read the data on the paging channel will be hereafter referred to as the "acquisition time".

It would also be known to one skilled in the art that it is desirous to reduce the duration of the acquisition time to increase the duration for which the mobile unit can remain in the idle mode. This would reduce the power consumption in the mobile unit.

One method of reducing the acquisition time is by the utilization of a very accurate and high frequency oscillator. However, such high frequency oscillators themselves consume a relatively large amount of power and therefore, the high frequency oscillators themselves become an important consideration in the reduction of battery power consumption in portable, battery powered mobile units. Therefore, an economical and easily implemented low power, code division multiplexing compatible, synchronization technique that can reduce the acquisition time, reduce power consumption, and yet maintain accurate synchronization between the mobile unit and the base station is desired.

SUMMARY OF THE INVENTION

Generally speaking, a frequency calibration circuit for use in a spread spectrum receiver is provided. The spread spectrum receiver may be for example, a cellular phone or any other type of wireless application that utilizes spread spectrum (CDMA) communication technology.

In the preferred embodiment, the receiver includes circuitry for receiving a spread spectrum signal from a base station and for recovering a network clock signal therefrom, a local oscillator, preferably a low frequency oscillator, for producing an oscillator clock signal, and a frequency comparator that takes as inputs the network clock signal and the oscillator clock signal and produces a calibration factor based on the difference between the clock signals. A controller coupled to the low frequency oscilator and the frequency comparator utilizes the calibration factor together with the low frequency oscillator clock signal to output a wake-up signal thereby being able to accurately reacquire the timing of the paging channel.

Accordingly, it is an object of the invention to provide an improved receiver that utilizes a local low frequency oscillator and thereby has a reduced power consumption.

Another object of the present invention to provide an improved receiver that requires a reduced acquisition time.

Still another object of the present invention to provide an improved receiver that accurately compensates for components that may have less than precise tolerances, thereby resulting in an overall less expensive receiver.

Still other objects of the invention will in part be obvious and will in part be apparent from the specification.

The invention accordingly comprises the features of construction, combination of elements, and arrangement of parts which will be exemplified in the following detailed disclosure, and the scope of the invention will be indicated in the claims.

BRIEF DESCRIPTION OF THE DRAWING

For an understanding of the invention, reference is made to the following description, taken in connection with the accompanying drawing, in which.

DETAILED DESCRIPTION OF THE PREFERRED EMBODIMENTS

Figure 1:
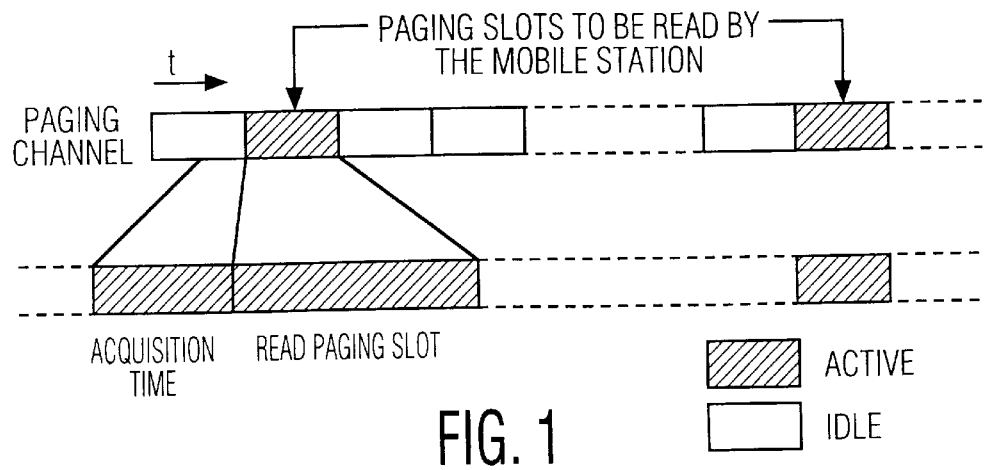
FIG. 1 is a timing chart of a spread spectrum receiver.
Figure 2:
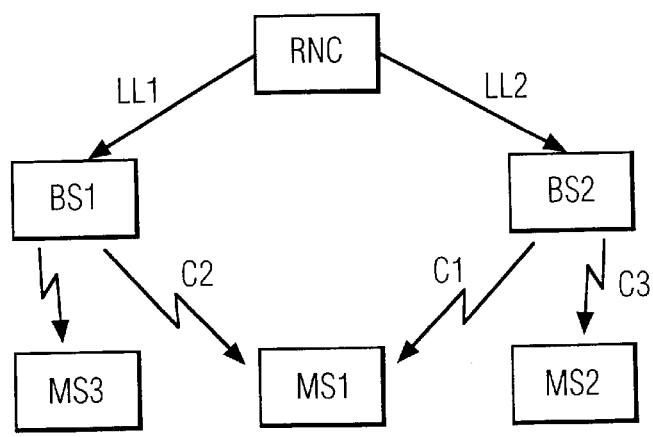
FIG. 2 is a block diagram of a spread spectrum communication system which is capable of transmitting and receiving spread spectrum transmissions and which may be used in the practice of the present invention.

Reference is first made to FIG. 2, wherein a first base station BS1 and a second base station BS2 are depicted. Base stations BS1 and BS2 may be connected to a radio network controller RNC by land lines LL1 and LL2. Base stations BS1 and BS2 may communicate with a plurality of mobile units MS1, MS2, MS3 over channels C1, C2, C3. Radio network controller RNC may also include several layers of hierarchical structure (not shown), such as a mobile switching center and base station controller.

For purposes of brevity, the construction generally of a CDMA mobile unit will be omitted as it is well understood by one of ordinary skill in the art.

As disclosed above, the preferable approach contemplated herein for reducing the power consumption in the mobile units is to utilize a low frequency oscillator for system time maintenance. Unfortunately, it is recognized that such inexpensive, low frequency oscillators on the market tend to be undesirably inaccurate with additional frequency drift, even over short lengths of time.

However, if such low frequency oscillators can be accurately calibrated, the acquisition time or lead time to reacquire the paging channel can be minimized thereby also reducing the duration of time the mobile unit must be in the active mode (thereby reducing the overall power consumption in the mobile unit). Additionally, because the low frequency oscillators consume less power than its high frequency counterpart, a mobile unit construction that utilizes a low frequency oscillator will also use less power than a mobile unit that uses a high frequency oscillator.

Figure 3:
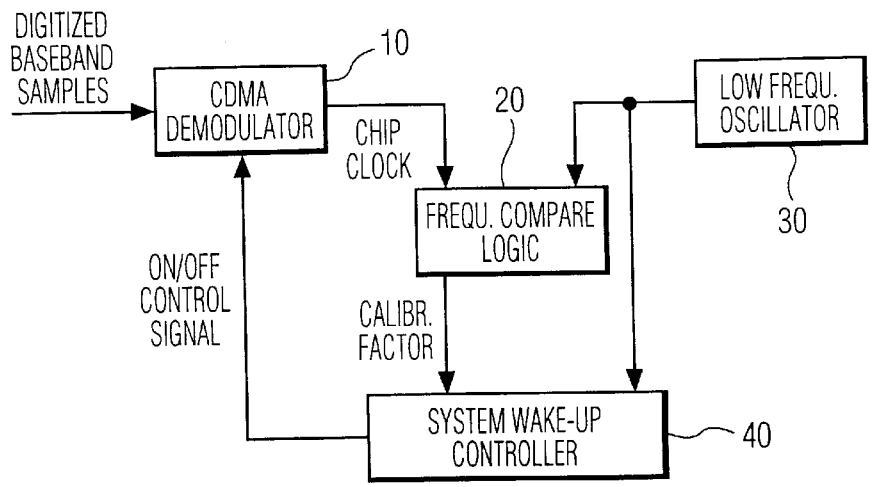
FIG. 3 is a block diagram of a calibration circuit constructed in accordance with the present invention.

Accordingly, reference is now made to FIG. 3 which illustrates the calibration circuitry to accurately calibrate the preferred low frequency oscillator wherein the low frequency oscillator is calibrated against the system time received from the system network.

As illustrated, the mobile unit calibration circuit preferably includes a CDMA demodulator 10 having an input to receive a baseband signal and an output which outputs the chip clock of the network, the chip clock signal having been recovered from the baseband signal. A frequency comparator 20 is coupled to the output of CDMA demodulator 10. Frequency comparator 20 receives as inputs the chip clock signal from demodulator 10 and the output of a low frequency oscillator 30. Lastly, a controller 40 is provided and is coupled to the output of frequency comparator 20 and low frequency oscillator 30. The output of controller 40 is coupled to demodulator 10.

The operation of the calibration circuitry is as follows. During the active mode, the demodulator (Rake receiver) receives a baseband signal and after the demodulation thereof, the chip clock signal from the baseband signal is recovered. The chip clock and the clock of the low frequency oscillator (as inputs to frequency comparator 20) are then compared in frequency comparator 20 and a calibration factor is calculated. For example, during one clock cycle of the low frequency clock, the number of cycles of the network clock (chip clock) are computed. The calibration factor (the computed error of the low frequency clock) is then received as an input by controller 40. Controller 40 also receives the output of oscillator 30. In this way, controller 40 can adjust for the frequency drift in oscillator 30 by adding (or subtracting) the calibration factor to (from) the wake-up time.

Thereafter, during idle mode, wake-up controller 40 switches off CDMA demodulator 10 and other components of the mobile unit so as to conserve power, although it is recognized that during idle mode, other procedures/functions may be performed, such as paging channel monitoring procedures, message acknowlegement procedures, registration procedures, idle handoff procedures, among others.

It can now be appreciated that controller 40 can utilize a recalibrated low frequency oscillator clock signal to reacquire the timing of the paging channel and other necessary components of the mobile unit. That is, for example, controller 40 will be maintaining an accurate count of the number of oscillations of low frequency oscillator 30, and after a predetermined number thereof, will wake up the system in a known manner. However, if the frequency of oscillator 30 is 32 KHz and during calibration it is determined that oscillator 30 is off 1% and the system is to be in idle mode for one (1) second, controller 40 will count 32,320 cycles (32,000+320) before reacquiring the paging channel.

By providing a calibration circuit that utilizes a low frequency oscillator, an improved low power consumption receiver is provided. Also, by utilizing the above invention, an improved receiver that requires a reduced acquisition time to reacquire a paging channel is provided. Moreover, utilization of the present invention will provide an improved receiver that accurately compensates for components that may have less than precise tolerances, thereby resulting in an overall less expensive receiver.

I claim:

1. A receiver for use in a communication system having a transmitter for transmitting a spread-spectrum signal, said receiver comprising:

receiver means for receiving said spread spectrum signal and for recovering a network clock signal therefrom;

an oscilator for producing an oscillator clock signal;

frequency comparator means coupled to said receiver means and said oscillator for receiving said network clock signal and said oscillator clock signal and for producing a calibration factor based on a comparison of the network clock signal and said oscillator clock signal;

a controller coupled to said oscilator and said frequency comparator means for outputting a wake-up signal based on said calibration factor.

2. The receiver as claimed in claim 1, wherein said oscillator is a low frequency oscilator with a clock frequency less than the frequency of said network clock signal.

3. The receiver as claimed in claim 2, wherein said low frequency oscillator has a clock frequency of about 32 KHz.

4. A receiver for use in a communication system having a transmitter for transmitting a spread-spectrum signal, said receiver comprising:

receiver means for receiving said spread spectrum signal and for recovering a network clock signal therefrom;

an oscillator for producing an oscillator clock signal;

frequency comparator means coupled to said receiver means and said oscillator for receiving said network clock signal and said oscillator clock signal and for producing a calibration factor based on a comparison of the network clock signal and said oscillator clock signal; and a controller coupled to said oscillator and said frequency comparator means for outputting a wake-up signal after a predetermined period of time, the predetermined period of time being calculated from said oscillator clock signal and said calibration factor.

5. The receiver as claimed in claim 4, wherein said oscillator clock signal oscillates at a first frequency and said controller has means for counting the number of oscillations of said oscillator clock signal, said predetermined period of time being computed from the number of oscillations of said oscillator clock signal plus or minus a further percentage of said first frequency, said percentage being said calibration factor.

* * * * *